United States Patent
Liu et al.

(10) Patent No.: US 10,745,287 B2
(45) Date of Patent: Aug. 18, 2020

(54) METHOD FOR PREPARING INDUSTRIAL GRADE LITHIUM CARBONATE FROM CRUDE LITHIUM FLUORIDE AND LITHIUM CARBONATE PRODUCT

(71) Applicant: Hunan Jinyuan New Materials Co., Ltd., Yiyang (CN)

(72) Inventors: Xunbing Liu, Yiyang (CN); Jianjun Ouyang, Yiyang (CN); Xijuan Liu, Yiyang (CN)

(*) Notice: Subject to any disclaimer, the term of this patent is extended or adjusted under 35 U.S.C. 154(b) by 36 days.

(21) Appl. No.: 16/261,782

(22) Filed: Jan. 30, 2019

(65) Prior Publication Data
US 2019/0152793 A1    May 23, 2019

Related U.S. Application Data

(63) Continuation of application No. PCT/CN2017/105874, filed on Oct. 12, 2017.

(30) Foreign Application Priority Data

Aug. 27, 2016 (CN) .......................... 2016 1 0732496

(51) Int. Cl.
| | | |
|---|---|---|
| C01D 15/00 | (2006.01) | |
| C01D 15/08 | (2006.01) | |
| C22B 26/12 | (2006.01) | |
| H01M 10/54 | (2006.01) | |

(52) U.S. Cl.
CPC .............. *C01D 15/08* (2013.01); *C22B 26/12* (2013.01); *H01M 10/54* (2013.01)

(58) Field of Classification Search
CPC ......... C01D 15/08; C22B 26/12; H01M 10/54
USPC .............................................. 423/179.5, 421
See application file for complete search history.

(56) References Cited

U.S. PATENT DOCUMENTS

| 2005/0123670 A1 | 6/2005 | Vasquez | |
| 2011/0318253 A1* | 12/2011 | Tiihonen | B01J 49/53 |
| | | | 423/422 |
| 2018/0177732 A1 | 6/2018 | Barnscheid et al. | |

FOREIGN PATENT DOCUMENTS

| CN | 101712481 A | | 5/2010 |
| CN | 102030346 A | * | 4/2011 |
| CN | 102515203 A | | 6/2012 |
| CN | 102897804 A | | 1/2013 |
| CN | 103508462 A | | 1/2014 |

OTHER PUBLICATIONS

Internation Search Report of PCT/CN2017/105874, dated Jan. 15, 2018.
Yu, Chao et al, Research on Application and Manufacturing Method of Lithium Carbonate, Xinjiang Youse Jinshu Supplement, Dec. 31, 2017, p. 100, 1 Introdution.

* cited by examiner

*Primary Examiner* — Steven J Bos
(74) *Attorney, Agent, or Firm* — Erson IP (Nelson IP)

(57) ABSTRACT

A method for preparing industrial grade lithium carbonate from crude lithium fluoride includes the following steps: a, pulping by stirring crude lithium fluoride into a pulp, and adding an acid to prepare a crude lithium fluoride pulp-like material; b, double decomposition by adding the lithium fluoride pulp-like material obtained in the step a into a boiling calcium chloride solution, and then adding an alkaline substance to obtain a lithium chloride solution; c, lithium carbonate precipitation by heating the lithium chloride solution obtained in the step b, adding a carbonate solution according to the mass of lithium in the lithium chloride solution, stirring at a constant temperature, and filtering, wherein the filter cake is a lithium carbonate product. The lithium fluoride is decomposed at one time in a low-acidity environment; fluoride ions are removed; and a double decomposition reaction is used to decompose the lithium fluoride into lithium ions and calcium fluoride precipitates.

17 Claims, No Drawings

METHOD FOR PREPARING INDUSTRIAL GRADE LITHIUM CARBONATE FROM CRUDE LITHIUM FLUORIDE AND LITHIUM CARBONATE PRODUCT

CROSS-REFERENCE TO RELATED APPLICATIONS

This application is a continuation of International Patent Application No. PCT/CN2017/105874 with a filing date of Oct. 12, 2017, designating the United States, now pending, and further claims priority to Chinese Patent Application No. 201610732496.0 with a filing date of Aug. 27, 2016. The content of the aforementioned applications, including any intervening amendments thereto, are incorporated herein by reference.

TECHNICAL FIELD

The present disclosure relates to a method for preparing lithium carbonate and a lithium carbonate product.

BACKGROUND OF THE PRESENT INVENTION

In circular economy of battery scraps, lithium elements in battery scraps are generally recovered by precipitating lithium fluoride with sodium fluoride. The prepared crude lithium fluoride serves as a lithium raw material and then is refined into lithium carbonate. The most serious problems are decomposition and fluoride removal of the lithium fluoride. Conventional acidolysis is relatively difficult, consumes a lot of acid, has a severe operating environment, and has low decomposition rate. It needs repeated decomposition, so that a technological process is long and cost is high. Due to high corrosivity of the hydrofluoric acid produced after decomposition, it is volatile, has high requirements for corrosion prevention of equipment especially in a strong acid environment, and requires enormous investment. It is also very difficult to protect operators. Therefore, there is no better method for preparing lithium carbonate from lithium fluoride at present.

SUMMARY OF PRESENT INVENTION

The existing acidolysis is relatively difficult, consumes a lot of acid, has a severe operating environment, and has low decomposition rate. It needs repeated decomposition, so that a technological process is long and cost is high. Due to high corrosivity of the hydrofluoric acid produced after decomposition, it is volatile, has high requirements for corrosion prevention of equipment especially in a strong acid environment, and requires enormous investment. It is also very difficult to protect operators. The purpose of the present disclosure is to disclose a simple and economic method for preparing industrial grade lithium carbonate from crude lithium fluoride capable of decomposing the lithium fluoride at one time and removing fluoride ions in a low-acidity environment.

A technical solution of the present disclosure is as follows: the method for preparing the industrial grade lithium carbonate from the crude lithium fluoride specifically includes the following steps:

a, pulping by stirring crude lithium fluoride into a pulp, and adding an acid to prepare a crude lithium fluoride pulp-like material;

b, double decomposition by adding the crude lithium fluoride pulp-like material obtained in the step a into a boiling calcium chloride solution, and then adding an alkaline substance to prepare a lithium chloride solution; and c, lithium carbonate precipitation by heating the lithium chloride solution obtained in the step b, adding a carbonate solution according to the mass of lithium in the lithium chloride solution, stirring at a constant temperature, and filtering, wherein a filter cake is a lithium carbonate product.

Further, the step of pulping includes: stirring the crude lithium fluoride into a pulp, and adding an acid to regulate a pH value to 0.5-3, preferably 1.0-2.5 and 1.5-2.0, thereby preparing a crude lithium fluoride pulp-like material.

Further, the step of double decomposition includes: preparing a calcium chloride solution, and heating to a boiling state for later use; then adding the crude lithium fluoride pulp-like material obtained in the step a into the boiling calcium chloride solution, adding sodium hydroxide, maintaining the temperature and reacting for 0.5-5.0 hours, preferably 1.0-4.5 hours, 1.5-4.0 hours, 2.0-3.5 hours and 2.5-3.0 hours in sequence, filtering and washing, with a filtrate being a lithium chloride solution to enter a next procedure.

Further, the step of lithium carbonate precipitation includes: heating and dissolving sodium carbonate according to a mass fraction of 10-25%, preferably 15-20%, and maintaining the temperature at 60-100° C., preferably 65-95° C., 70-90° C., 75-85° C. and 80° C. in sequence; then heating the lithium chloride solution prepared in the step b to 60-100° C., preferably 65-9.5° C., 70-90° C., 75-85° C. and 80° C. in sequence; slowly adding a pure carbonate solution according to an amount of 6-15 times of the mass of lithium in the lithium chloride solution, preferably 7-14 times, 8-13 times, 9-12 times and 10-11 times, wherein the adding speed is 0.5-2.0 m³/h, preferably 1-1.5 m³/h; maintaining the temperature and stirring for 0.5-4 hours, preferably 1.0-3.5 hours, 1.5-3.0 hours and 2-2.5 hours in sequence; and filtering, washing, merging the filtrate and the washing liquor for dissolving the sodium carbonate, wherein a filter cake is a lithium carbonate product.

Further, the added acid is one or more of sulfuric acid, hydrochloric acid and nitric acid.

Further, the carbonate solution is one or more of a sodium carbonate solution, a potassium carbonate solution and an ammonium carbonate solution.

Further, the alkaline substance is one or more of sodium hydroxide, potassium hydroxide and ammonium hydroxide.

Because the above technical solution is adopted in the present disclosure, the lithium fluoride is decomposed at one time in the low-acidity environment, fluoride ions are removed, and a double decomposition reaction is used to decompose the lithium fluoride into lithium ions and calcium fluoride precipitates, so as to complete decomposition and fluoride removal at one time. The operations are simple, production cost is low, and the recovery rate of lithium element is high.

BEST IMPLEMENTATION OF PRESENT INVENTION

A method for preparing industrial grade lithium carbonate from crude lithium fluoride includes the following steps:

a, pulping by crude lithium fluoride was stirred into a pulp in a pulping barrel according to a solid-liquid mass ratio of 1:2.5; the pH was regulated as 1.5 with hydrochloric acid; b, double decomposition reaction: calcium chloride was dissolved in a decomposition barrel according to a mass fraction of 30%, and heated to a boiling state for later use; the crude lithium fluoride pulp-like material obtained in, the step a was added into the boiling calcium chloride solution at a speed of 0.2 m$^3$ per hour, calcium ion content in the solution was checked in the step, and addition of the crude lithium fluoride pulp was stopped when the calcium ion content reached about 0.5 g/L; the pH value of lithium liquid was regulated as 13 with sodium hydroxide, and the reaction was carried out at a constant temperature for 1.5 hours; the solution was filtered and washed; the filter cake was a calcium fluoride by-product; the lithium chloride solution was the filtrate to enter the next procedure; the washing liquor was used for preparing calcium chloride; c, lithium carbonate precipitation by the sodium carbonate was heated and dissolved in a sodium carbonate dissolving barrel according to a mass fraction of 20%, and the temperature was maintained at 100° C.; the lithium chloride solution was heated to 100° C. in a lithium precipitation barrel, and a thermal sodium carbonate solution with an amount of pure sodium carbonate was slowly added according to the amount of 9.5 times of the mass of the lithium, wherein the adding speed was 0.3 m$^3$/h; stirring was performed at a constant temperature for 2.5 hours; the solution was filtered and washed; and the filtrate and washing liquor were merged for dissolving the sodium carbonate, wherein the filter cake is the lithium carbonate product.

PREFERRED EMBODIMENT OF THE DISCLOSURE

The present disclosure will be further described below in combination with specific embodiments.

A method for preparing industrial grade lithium carbonate from crude lithium fluoride includes the following steps:

a, pulping by crude lithium fluoride was stirred into a pulp, and an acid was added to prepare a crude lithium fluoride pulp-like material;

b, double decomposition by the crude lithium fluoride pulp-like material obtained in the step a was added into a boiling calcium chloride solution, then an alkaline substance was added to prepare a lithium chloride solution; and c, lithium carbonate precipitation by the lithium chloride solution obtained in the step b was heated, a carbonate solution was added according to the mass of lithium in the lithium chloride solution, stirring was performed at a constant temperature, and the solution was filtered, wherein a filter cake is a lithium carbonate product.

Embodiment 1: a method for preparing industrial grade lithium carbonate from crude lithium fluoride includes the following steps:

a, pulping by crude lithium fluoride was stirred into a pulp in a pulping barrel according to a solid-liquid mass ratio of 1:1; the pH was regulated as 1.0 with hydrochloric acid; b, double decomposition reaction: calcium chloride was dissolved in a decomposition barrel according to a mass fraction of 30%, and heated to a boiling state for later use; the crude lithium fluoride pulp-like material obtained in the step a was added into the boiling calcium chloride solution at a speed of 0.5 m$^3$ per hour, calcium ion content in the solution was checked in the step, and addition of the crude lithium fluoride pulp was stopped when the calcium ion content reached about 2 g/L; the pH value of lithium liquid was regulated as 12 with sodium hydroxide, and the reaction was carried out at a constant temperature for 2 hours; the solution was filtered and washed; the filter cake was a calcium fluoride by-product; the lithium chloride solution was the filtrate to enter the next procedure; the washing liquor was used for preparing calcium chloride; c, lithium carbonate precipitation by the sodium carbonate was heated and dissolved in a sodium carbonate dissolving barrel according to a mass fraction of 25%, and the temperature was maintained at 100° C.; the lithium chloride solution was heated to 100° C. in a lithium precipitation barrel, and a thermal sodium carbonate solution with an amount of pure sodium carbonate was slowly added according to the amount of 9 times of the mass of the lithium, wherein the adding speed was 0.5 m$^3$/h; stirring was performed at a constant temperature for 1 hour; the solution was filtered and washed; and the filtrate and washing liquor were merged for dissolving the sodium carbonate, wherein the filter cake is the lithium carbonate product. A number of N times of the mass of the lithium in the lithium chloride solution means a mass factor of the lithium to carbonate. Similarly hereinafter.

Embodiment 2: a method for preparing industrial grade lithium carbonate from crude lithium fluoride includes the following steps:

a, pulping by crude lithium fluoride was stirred into a pulp in a pulping barrel according, to a solid-liquid mass ratio of 1:2; the pH was regulated as 0.5 with nitric acid; b, double decomposition reaction: calcium chloride was dissolved in a decomposition barrel according to a mass fraction of 20%, and heated to a boiling state for later use; the crude lithium fluoride pulp-like material obtained in the step a was added into the boiling calcium chloride solution at a speed of 0.2 m$^3$ per hour, calcium ion content in the solution was checked in the step, and addition of the crude lithium fluoride pulp was stopped when the calcium ion content reached about 1 g/L; the pH value of lithium liquid was regulated as 13 with sodium hydroxide, and the reaction was carried out at a constant temperature for 1 hour; the solution was filtered and washed; the filter cake was a calcium fluoride by-product; the lithium chloride solution was the filtrate to enter the next procedure; the washing liquor was used for preparing calcium chloride; c, lithium carbonate precipitation by the sodium carbonate was heated and dissolved in a sodium carbonate dissolving barrel according to a mass fraction of 20%, and the temperature was maintained at 90° C.; the lithium chloride solution was heated to 90° C. in a lithium precipitation barrel, and a thermal sodium carbonate solution with an amount of pure sodium carbonate was slowly added according to the amount of 10 times of the mass of the lithium, wherein the adding speed was 0.5 m$^3$/h; stirring was performed at a constant temperature for 3 hours; the solution was filtered and washed; and the filtrate and washing liquor were merged for dissolving the sodium carbonate, wherein the filter cake is the lithium carbonate product.

Embodiment 3: a method for preparing industrial grade lithium carbonate from crude lithium fluoride includes the following steps:

a, pulping by crude lithium fluoride was stirred into a pulp in a pulping barrel according to a solid-liquid mass ratio of 1:3; the pH was regulated as 2.0 with hydrochloric acid; b, double decomposition reaction: calcium chloride was dissolved in a decomposition barrel according to a mass fraction of 30%, and heated to a boiling state for later use; the crude lithium fluoride pulp-like material obtained in the step a was added into the boiling calcium chloride solution at a speed of 0.3 m$^3$ per hour, calcium ion content in the solution was checked in the step, and addition of the crude lithium fluoride pulp was stopped when the calcium ion content reached about 0.5 g/L; the pH value of lithium liquid was regulated as 10 with sodium hydroxide, and the reaction was carried out at a constant temperature for 2 hours; the solution was filtered and washed; the filter cake was a calcium fluoride by-product; the lithium chloride solution was the filtrate to enter the next procedure; the washing liquor was used for preparing calcium chloride; c, lithium carbonate precipitation by the sodium carbonate was heated and dissolved in a sodium carbonate dissolving barrel according to a mass fraction of 25%, and the temperature was maintained at 100° C.; the lithium chloride solution was heated to 100° C. in a lithium precipitation barrel, and a thermal sodium carbonate solution with an amount of pure sodium carbonate was slowly added according to the amount of 10 times of the mass of the lithium, wherein the adding speed was 0.4 m$^3$/h; stirring was performed at a constant temperature for 1.5 hours; the solution was filtered and washed; and the filtrate and washing liquor were merged for dissolving the sodium carbonate, wherein the filter cake is the lithium carbonate product.

Embodiment 4: a method for preparing industrial grade lithium carbonate from crude lithium fluoride includes the following steps:

a, pulping by crude lithium fluoride was stirred into a pulp in a pulping barrel according to a solid-liquid mass ratio of 1:2.5; the pH was regulated as 1.5 with hydrochloric acid; b, double decomposition reaction: calcium chloride was dissolved in a decomposition barrel according to a mass fraction of 30%, and heated to a boiling state for later use; the crude lithium fluoride pulp-like material obtained in the step a was added into the boiling calcium chloride solution at a speed of 0.2 m$^3$ per hour, calcium ion content in the solution was checked in the step, and addition of the crude lithium fluoride pulp was stopped when the calcium ion content reached about 0.5 g/L; the pH value of lithium liquid was regulated as 13 with sodium hydroxide, and the reaction was carried out at a constant temperature for 1.5 hours; the solution was filtered and washed; the filter cake was a calcium fluoride by-product; the lithium chloride solution was the filtrate to enter the next procedure; the washing liquor was used for preparing calcium chloride; c, lithium carbonate precipitation by the sodium carbonate was heated and dissolved in a sodium carbonate dissolving barrel according to a mass fraction of 20%, and the temperature was maintained at 100° C.; the lithium chloride solution was heated to 100° C. in a lithium precipitation barrel, and a thermal sodium carbonate solution with an amount of pure sodium carbonate was slowly added according to the amount of 9.5 times of the mass of the lithium, wherein the adding speed was 0.3 m$^3$/h; stirring was performed at a constant temperature for 2.5 hours; the solution was filtered and washed; and the filtrate and washing liquor were merged for dissolving the sodium carbonate, wherein the filter cake is the lithium carbonate product.

Embodiment 5: a method for preparing industrial grade lithium carbonate from crude lithium fluoride includes the following steps:

a, pulping by 2.5 m$^3$ of clean water or washing water was added into 5 m$^3$ of pulping barrel in advance; stirring was started; 1.5 t of crude lithium fluoride was added and stirred into a pulp; hydrochloric acid was added to regulate the pH as 0.5; the pump was stirred for 30 minutes; the pH value was kept as 0.5 with acid; 3 m$^3$ of clean water or washing water was added into 10 m$^3$ of decomposition barrel in advance; and 1.0 t of calcium chloride was added, stirred and heated to a boiling state for later use; b, double decomposition reaction: the crude lithium fluoride pulp-like material obtained in the step a was added into the boiling calcium chloride solution at a speed of 0.5 m$^3$ per hour, calcium ion content in the solution was checked in the step, and addition of the crude lithium fluoride pulp was stopped when the calcium ion content reached about 0.5 g/L; the pH value of lithium liquid was regulated as 13 with sodium hydroxide, and the reaction was carried out at a constant temperature for 1 hour; the solution was filtered and washed; the filter cake was a calcium fluoride by-product; the lithium chloride solution was the filtrate to enter the next procedure; the washing liquor was used for preparing calcium chloride; c, lithium carbonate precipitation by 3.0 m$^3$ of water was added into 5 m$^3$ of sodium carbonate dissolving barrel in advance; 650 kg of sodium carbonate was added, stirred and heated to a boiling state; 5 m$^3$ of lithium chloride solution was pumped into 10 m$^3$ of lithium precipitation barrel and was heated to 100° C. and then stirred; the content of lithium was detected; a thermal solution with an amount of pure sodium carbonate was added according to the amount of 9 times of the mass of the lithium, wherein the adding speed was 0.5 m$^3$/h; stirring was performed at a constant temperature for 3 hours; the solution was filtered and washed; and the filtrate and washing liquor were merged for dissolving the sodium carbonate, wherein the filter cake is the lithium carbonate product.

Embodiments of the present disclosure are not limited to the above examples. Each technical key point within and beyond a parameter scope of the technical solution of the present disclosure, and technical features reasoned, expanded and rearranged by those skilled in the art according to the technical solution of the present disclosure shall belong to the scope illustrated in, the embodiments of the present disclosure.

INDUSTRIAL APPLICABILITY

After a pilot test in the present disclosure, related indicators of detection and yield are shown in the following table:

| Item | Detection results | | | | | | |
|---|---|---|---|---|---|---|---|
| | Li | Ca | Co | Fe | Ni | Pb | Na |
| Crude lithium fluoride % | 15.23 | 1.32 | 0.04 | 0.47 | 0.05 | 0.001 | 2.45 |
| Lithium chloride solution g/L | 21.83 | 0.076 | 0.0041 | 0.0039 | 0.0019 | 0.0004 | 3.54 |
| Calcium fluoride residues % | 0.019 | 23.67 | 0.11 | 0.44 | 0.10 | 0.01 | 0.54 |
| Decomposition rate % | 98.7 | | | | | | |
| Lithium carbonate % | 18.21 | 0.001 | 0.001 | 0.0001 | 0.0001 | 0.0001 | 0.60 |
| Lithium precipitation mother liquor | Lithium yield of 85.11% | | | | | | |
| Lithium carbonate washing liquor | Lithium yield of 91.04% | | | | | | |
| Total lithium yield % | 98.7% × 95% = 93.77 The lithium precipitation mother liquor and, the lithium carbonate washing liquor are returned for preparing the sodium carbonate solution, and the lithium yield is calculated as 95%. | | | | | | |

We claim:

1. A method for preparing industrial grade lithium carbonate from crude lithium fluoride, comprising the following steps:
   a, pulping by stirring the crude lithium fluoride into a pulp, and adding an acid to prepare a crude lithium fluoride pulp;
   b, double decomposition by adding the crude lithium fluoride pulp obtained in the step a into a boiling calcium chloride solution, and then adding an alkaline substance to prepare a lithium chloride solution; and
   c, lithium carbonate precipitation by heating the lithium chloride solution obtained in the step b, adding a carbonate solution to the heated lithium chloride solution, stirring at a constant temperature, and then filtering, to obtain a filter cake of the lithium carbonate.

2. The method for preparing the industrial grade lithium carbonate from the crude lithium fluoride according to claim 1, wherein the step of pulping comprises: stirring the crude lithium fluoride into the pulp according to a solid-liquid mass ratio of 1:1-3, and adding an acid to regulate a pH value to 0.5-3 to prepare the crude lithium fluoride pulp, wherein the acid is added to regulate the pH value to 1.0-2.5.

3. The method for preparing the industrial grade lithium carbonate from the crude lithium fluoride according to claim 1, wherein the added acid is one or more of sulfuric acid, hydrochloric acid and nitric acid.

4. The method for preparing the industrial grade lithium carbonate from the crude lithium fluoride according to claim 1, wherein the step of double decomposition comprises:
   preparing a calcium chloride solution, and heating to a boiling state for later use to obtain the boiling calcium chloride solution; then adding the crude lithium fluoride pulp obtained in the step a into the boiling calcium chloride solution, adding sodium hydroxide, maintaining the boiling state and reacting for 0.5-5.0 hours, filtering and then washing.

5. The method for preparing the industrial grade lithium carbonate from the crude lithium fluoride according to claim 4, wherein in the process of adding the crude lithium fluoride pulp into the boiling calcium chloride solution, addition of the crude lithium fluoride pulp is stopped when calcium ion content reaches 0.5-3 g/L.

6. The method for preparing the industrial grade lithium carbonate from the crude lithium fluoride according to claim 4, wherein the alkaline substance is one or more of sodium hydroxide, potassium hydroxide and ammonium hydroxide.

7. The method for preparing the industrial grade lithium carbonate from the crude lithium fluoride according to claim 4, wherein the temperature is maintained to react for 1.0-4.5 hours.

8. The method for preparing the industrial grade lithium carbonate from the crude lithium fluoride according to claim 1, wherein the step of lithium carbonate precipitation comprises: preparing the carbonate solution; then heating the lithium chloride solution prepared in the step b to 60-100° C.; adding a sodium carbonate solution with a sodium carbonate amount according to an amount of 6-15 times of a mass of lithium in the lithium chloride solution; maintaining the temperature and stirring for 0.5-4 hours; and then filtering and washing to obtain the filter cake of the lithium carbonate.

9. The method for preparing the industrial grade lithium carbonate from the crude lithium fluoride according to claim 8, wherein the step of preparing the carbonate solution comprises: heating and dissolving sodium carbonate according to a mass fraction of 10-25%, and maintaining the temperature at 60-100° C.

10. The method for preparing the industrial grade lithium carbonate from the crude lithium fluoride according to claim 1, wherein the carbonate solution is one or more of a sodium carbonate solution, a potassium carbonate solution and an ammonium carbonate solution.

11. The method for preparing the industrial grade lithium carbonate from the crude lithium fluoride according to claim 8, wherein the sodium carbonate solution with a sodium carbonate amount is added according to an amount of 7-14 times of the mass of lithium in the lithium chloride solution, and the temperature is maintained and stirring is conducted for 1.0-3.5 hours.

12. The method for preparing the industrial grade lithium carbonate from the crude lithium fluoride according to claim 8, wherein the addition of the carbonate solution is slow addition.

13. The method for preparing the industrial grade lithium carbonate from the crude lithium fluoride according to claim 12, wherein for the slow addition, adding speed is 0.5-2.0 $m^3/h$.

14. The method for preparing the industrial grade lithium carbonate from the crude lithium fluoride according to claim 1, wherein the carbonate solution is one or more of a sodium carbonate solution, a potassium carbonate solution and an ammonium carbonate solution.

15. The method for preparing the industrial grade lithium carbonate from the crude lithium fluoride according to claim 4, wherein for the washing, washing liquor is a product of the washing, and the washing liquor is used for preparing calcium chloride.

16. The method for preparing the industrial grade lithium carbonate from the crude lithium fluoride according to claim 8, wherein in the filtering and washing, filtrate is a product of the filtering, and washing liquor is a product of the washing, the filtrate and the washing liquor are merged for dissolving the sodium carbonate.

17. The method for preparing the industrial grade lithium carbonate from the crude lithium fluoride according to claim 1, further comprising: drying the filter cake to obtain a dried filter cake of the lithium carbonate.

* * * * *